May 17, 1949.  T. A. GADWA ET AL  2,470,483
APPARATUS FOR CONTACTING A LIQUID AND A VAPOR
Filed May 8, 1947
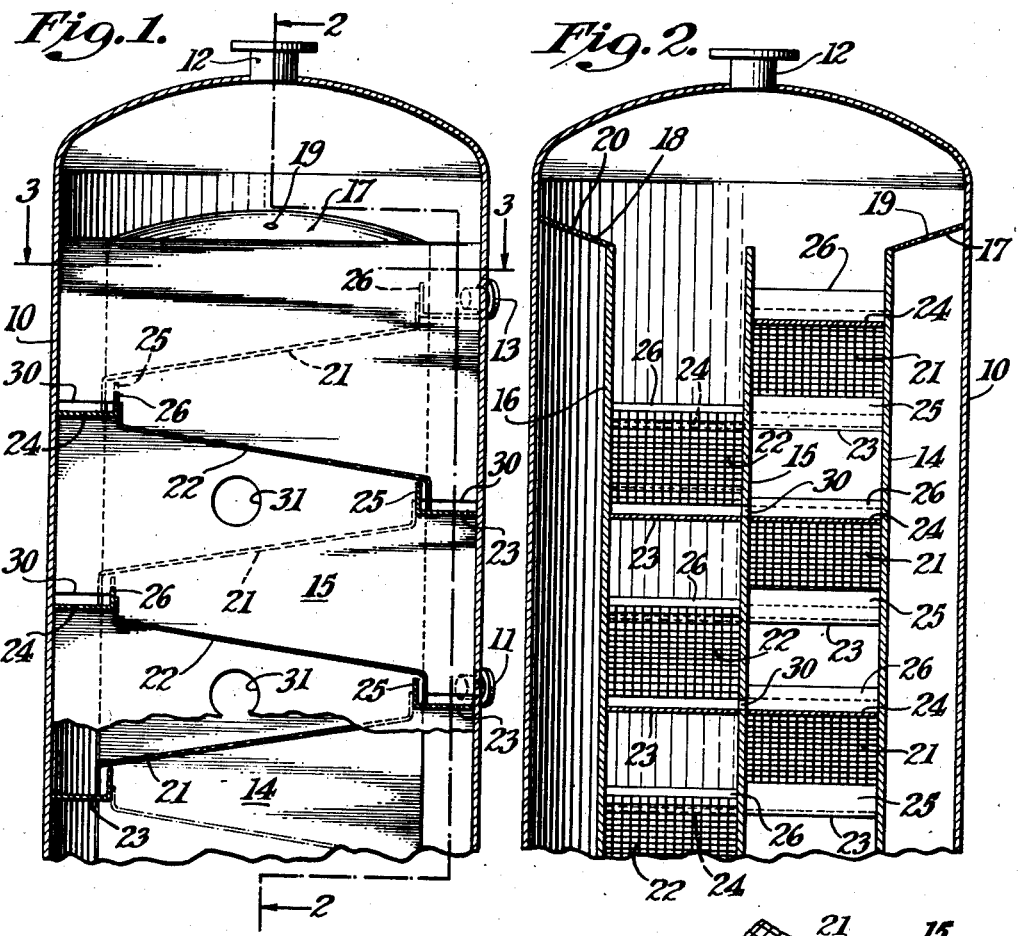
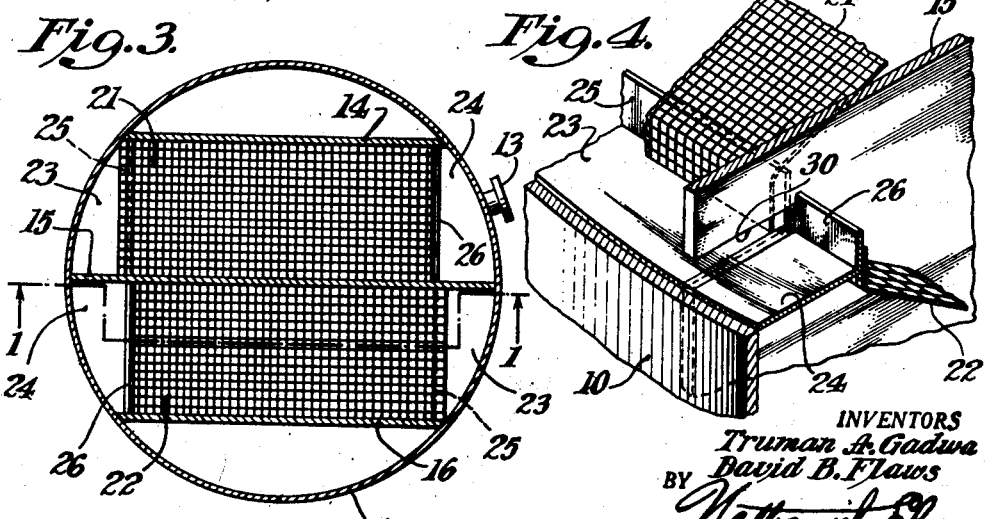
INVENTORS
Truman A. Gadwa &
David B. Flaws
BY Nathaniel Ely
ATTORNEY Patented May 17, 1949

2,470,483

UNITED STATES PATENT OFFICE 2,470,483

APPARATUS FOR CONTACTING A LIQUID AND A VAPOR

Truman A. Gadwa, Mount Vernon, and David B. Flaws, New York, N. Y., assignors to The Lummus Company, New York, N. Y., a corporation of Delaware Application May 8, 1947, Serial No. 746,658

4 Claims. (Cl. 261—113)

This invention relates to an apparatus for contacting a liquid and vapor and more particularly, for contacting a liquid and vapor under a vacuum.

In distillation apparatus suitable for vacuum service, the pressure drop per liquid-vapor contact stage must, of course, be kept as low as possible consistent with other tower design factors. Vacuum distillation is usually employed on heat sensitive materials and where the pressure drop at each deck is large the pressure in the bottom of the tower becomes excessive. A high temperature is required, therefore, to boil the liquid at the bottom of the column and at such temperature a part of the product liquid will polymerize thereby causing a loss in output of the desired product.

Probably the most suitable deck type for vacuum service is the screen deck since it provides a liquid-vapor contact stage having a relatively low pressure loss while at the same time having a large liquid-vapor contact area. In addition, since the vapor release area is substantially uniform across the deck, less entrainment of the liquid on the deck will occur and thus the deck is relatively efficient. However, in a vacuum distillation column the ratio of liquid to vapor is small and a tower of a large cross-sectional area is required to accommodate the excessive volume of vapors at the allowable vapor velocities. The net result is that in the usual screen deck design, there is not enough liquid to completely cover the vapor-liquid contacting stages so that a considerable portion of the vapors are by-passed without contacting any of the liquid on the deck. This, of course, materially reduces the overall efficiency of the column.

It is proposed, therefore, to divide the tower into at least two longitudinal sections by a suitable baffle. Each of these sections is to be provided with a series of parallel screen decks, at an angle to the horizontal and so arranged that the top of one deck receives reflux liquid at a point just below and adjacent to, the bottom of the deck next above on the opposite side of the baffle. Similarly, the bottom of the first deck is so situated that it will feed liquid by a suitable gutter, ramp trough or any other suitable liquid collecting means, to the top of the deck next below which is also on the opposite side of the baffle. Thus, what we propose is a substantially continuous zig-zag screen path for the descending reflux liquid wherein each liquid-vapor contact stage has a maximum of free area for the passage of the ascending vapors while at the same time providing a maximum of liquid-vapor contact surface.

It is, therefore, a principal object of our invention to provide an improved apparatus particularly adapted to high vacuum distillations.

It is a further object of our invention to provide in a distillation column an apparatus suitable for contacting small quantities of liquid with large volumes of vapors.

Further objects and advantages of our invention will appear from the following disclosure taken in conjunction with the accompanying drawing in which, Figure 1 is a cut away view of a part of a distillation column adapted to show our invention;

Figure 2 is a view of the same part of the distillation column shown in Figure 1 but taken along the line 2—2 of Figure 1;

Figure 3 is a cross-sectional view of the distillation column taken along the line 3—3 of Figure 1; and Figure 4 is an enlarged, perspective view of the liquid trough and screen arrangement of Figure 1.

In the drawing, 10 denotes the shell of an ordinary distillation column having an inlet 11 for the feed to the column, an outlet 12 for the overhead vapors leaving the column, an inlet 13 for the reflux returned to the column from a reflux system not shown, but, of course, well known to the art.

For the purposes of this description, we have shown the column 10 divided in four sections by three longitudinal baffles 14, 15 and 16. These baffles extend from a suitable point above the bottom of the column, to a point below the top of the column. They may be fixed to the shell by any suitable means, such as welds, along the line of contact between the shell of column 10 and said baffles. At the top of the outside baffles 14 and 16, we have indicated, as shown more clearly in Figure 2, two plates 17 and 18. These plates serve to deflect any condensate that might form at the top of the column back into the reaction zones between baffles 15 and 14, and 15 and 16. These plates are fitted with vents, shown diagrammatically as 19 and 20, to allow for expansion inside the space between the baffles and the shell. Similarly, plates may be secured between the lower ends of the baffles 16 and 14 and the shell of the column.

Between the baffles 14, 15 and 16 are a plurality of segmental troughs 23 and 24 supporting a series of transversely sloped screens 21 and 22. The troughs 23 are provided with flow guide baffles or dams 25 which are substantially higher than the weirs 26 mounted on the troughs 24. The two troughs 23 and 24 on either side of the baffle 15 are placed in communication with each other by means of the openings or slots 30. These slots are preferably extended across the entire width of the troughs to offer a maximum of free flow area to any liquid on the troughs. The top of the slots should be lower than the tops of the weirs 26 in order that a liquid seal may be maintained between the two troughs 23 and 24.

Extending between and supported by the troughs are, as mentioned above, a series of transversely sloped screen decks arranged in two vertical rows between the baffles 14, 15 and 16. As indicated in Figure 3, these decks are merely rectangular screens suitably attached to the baffles and at the troughs. A simple and convenient method of attaching the screens to the baffles would be to fold the sides adjacent the baffles upwardly and either spot weld or bolt the folded portions to the baffles. Similarly the upper ends of the decks, as indicated in Figure 4, may be folded upwardly and the vertical portions so formed suitably attached to the weir 26. These upwardly extending members should be attached so that a portion of the vertical pieces formed by the upward fold extends a short distance below the weir 26 thereby causing the liquid to flow from the weirs onto the screens and not onto the bottom of the troughs 24 as would otherwise be the case.

At their lower ends the screens are bent to form downwardly extending members, and may rest directly on the trough 23 or may be spaced from the bottom of the trough by means of clips or the like attached to the lower ends of the screens. The latter arrangement is, under most circumstances, the better one for if the lower ends of the screens are supported a short distance off the trough there will be no tendency for the liquid on the trough to accumulate more on one side of the screen than on the other. As shown most clearly in Figure 1, the screens should be supported on the troughs 23 so that the undersides of the screens do not come in contact with the top of the dam 25. This is important for otherwise any liquid flowing down the screens 21 or 22 would, if the screens were in contact with the dam, pass off, in part, to the outer side of the dam and not onto the trough 23 as desired.

This trough and screen deck arrangement is, as mentioned above, especially suitable for a column wherein there is only a small amount of descending reflux. It is apparent that for maximum column efficiency the screens should at all times be completely covered with reflux. It is, therefore, one function of the troughs to accumulate the liquid at intervals in the column and redistribute it over the entire width of the screen. Although a straight edged weir is shown in Figure 4, it is obvious that any other type of weir may be used. For instance, it may be desirable to use a notched or slotted weir to provide a more even distribution of the liquid over the screens.

The screen decks on the same side of baffle 15, as indicated in Figure 1, should be substantially parallel to each other to provide a uniform vapor disengaging zone between the several decks. There will usually be some entrainment of the liquid by the rising vapors and so there must be sufficient space for the vapors to separate from the liquid before reaching the decks next above. The vertical height of this vapor disengaging zone may be changed in several ways. For instance, it is obvious that the position of the trays 23 and 24 may be shifted to change the spacing between decks or the length of the downwardly extending members at the lower ends of the screens may be changed to accomplish the same result. The latter is obviously the best method since the slope of the screens will then be the same. It should be noted, however, that the lower end of the screens 21 and 22 should in any case extend a suitable distance below the top of the dam 25 to insure flow of all of the liquid descending on the screens onto the trough 23.

The slope of the screens, as indicated in Figure 1, has been somewhat exaggerated for purposes of illustration. The screens must be sloped just enough to establish an hydraulic gradient along the length of the deck sufficient to cause the small amount of liquid to flow and to provide a film of a relatively uniform thickness on the screen. An even depth of liquid is necessary to prevent localization of the vapors passing through the screen due to any varying resistance presented by liquid to the vapors and to thereby prevent excessive entrainment.

The reflux return 13 is shown in Figure 1 as opening on a half trough 24 which has a weir 26 for even distribution of the reflux over the top screen 21. The feed inlet 11 is, as indicated in Figure 1, placed so that the feed enters on a trough 24 on the same side of the tower as the reflux return 13.

Between adjacent pairs of decks, we have shown several equalizing spaces 31. These spaces are optional but may be used to insure equivalent vapor compositions on each side of the baffle 15 at the same point in the column. They may be of any size less than the area on the baffle 15 limited by the space described by successive screens 21 and 22.

It may be desirable to use some stiffening means to support the screens 21 and 22. For the sake of simplicity, these have been omitted, but may be described as, for instance, a steel supporting bar extending along the length of the screen and anchored to the weir at the upper end of the screen and to the shell of the column or supported on the trough 23 at the lower end of the screen. The screen could be then suitably attached to the supporting members. They are not necessary but are desirable under certain conditions.

From the preceding discussion, it is obvious that in high vacuum distillation there are two important advantages in passing the liquid across the tower at least twice in any one liquid vapor contact stage as compared with towers where it is passed but once. First, there is adequate space for the ascending vapors while at the same time the reflux liquid is distributed completely across the entire vapor area of the tower. Second, the vapor disengaging space between screens is substantially uniform across the tower since the alternate screens are parallel to each other. From the viewpoint of column efficiency, these factors are very important.

It is apparent, of course, that our invention may be used for other than vacuum distillation. For instance, it may be used in distillation operations carried out at atmospheric pressures and above and may also be used in any absorption process.

This tower is especially adapted to the resolution of such mixtures as vegetable oil. Vegetable oil is a mixture of the glycerides of the fatty acids such as oleic, stearic, linoleic, linolenic and palmitic acids. Usually it is desired to separate the saturated acids forming soap stock from the unsaturated forming the drying oils. Since the acids readily polymerize even at relatively low temperatures, it is necessary to carry out the operation at a very low pressure. In one actual process the operation is carried out under a tower pressure of 5 mm. of mercury absolute. It will be apparent that at this pressure the volume of reflux passed back to the tower will be very small. In fact, the returning reflux is merely enough to cause a thin film of liquid to flow on the screen. Under these conditions a wire screen of relatively close weave of large wire, such as 14 to 20 mesh of 0.025" diameter wire has been found to be effective.

A 14 mesh screen of this diameter has an open area of about 41.5% of the total area. A 20 mesh screen has about 25% of the total area. If the area of the troughs and baffles are taken into account, a tower having screens of 14 to 20 mesh will have a free area equal to about 20 to 35% of the entire tower cross-sectional area which represents a substantial improvement over the typical bubble cap tray design, for instance, where the free area is only about 10 to 15% of the cross-sectional area of the tower.

While we have shown and described a preferred form of embodiment of our invention, we are aware that modifications may be made thereto and we, therefore, desire a broad interpretation of our invention within the scope and spirit of the description herein and of the claims appended hereinafter.

We claim:

1. In a distillation column a plurality of segmental troughs, a plurality of vertical rows of transversely sloped screen decks, each of said decks extending from a trough at its upper end to a trough at its lower end and having its lower end adjacent the upper end of the screen next below but in an adjacent row and a continuous longitudinal baffle between each of said rows of sloped screen decks to restrict liquid flow to a single deck in a row, said baffle having openings adjacent the end of each deck whereby the lower end of each of said decks in one row is in direct communication with the upper end of the deck next below but in an adjacent row.

2. In a distillation column a plurality of segmental troughs, a plurality of vertical rows of transversely sloped screen decks, each of said decks being mutually parallel to every other deck in the same row and of opposite angularity to every other deck in the adjacent row, each of said decks extending from a trough at its upper end to a trough at its lower end, the lower end of each of said decks being adjacent to the upper end of the deck next below but in an adjacent row, and a longitudinal baffle between each of said rows of sloped screen decks restraining liquid to said decks respectively, said baffle having a horizontal passage between each adjacent pair of troughs whereby the lower end of each of said decks in one row is respectively in liquid communication with the upper end of the deck next below but in an adjacent row.

3. In an apparatus for contacting a liquid and a vapor, the combination of a column, a plurality of segmental troughs in said column, a plurality of vertical rows of transversely sloped screen decks, said decks of each row being substantially parallel to the other decks of the same row and attached at their upper ends to a trough and supported at their lower ends on a trough, the lower ends of each of said decks being adjacent the upper ends of the decks immediately below but in an adjacent row, a dam on the trough at the lower end of each of said decks whereby the descending liquid may be accumulated on said trough, a weir on the trough at the upper end of each of said decks whereby said liquid may be redistributed over said deck, a continuous longitudinal baffle between each of said rows of screen decks forming separate vapor paths and restricting liquid flow to a single deck in a row, said baffle having openings adjacent the end of each deck whereby the lower ends of said decks are in direct communication with the upper ends of the deck next below but in an adjacent row and means in said baffle whereby the vapors in said chamber rising through said vertical rows of screen decks may be mixed at intervals along the length of said column.

4. In a distillation column, a parallel pair of vertical rows of similarly spaced, downwardly sloped screen decks, the decks of each row being in parallelism and arranged with the lower ends of the decks in one row being on an adjacent level with the respective upper ends of the decks in the other row, baffle means extending between the rows of decks to define separate vapor passes, and means providing fluid communication between respective pairs of lower and upper deck ends that are on adjacent levels in different rows.

TRUMAN A. GADWA.
DAVID B. FLAWS.

REFERENCES CITED

The following references are of record in the file of this patent:

UNITED STATES PATENTS

| Number | Name | Date |
|---|---|---|
| 1,269,423 | Graham | June 11, 1918 |
| 1,419,867 | Laird | June 13, 1922 |
| 1,688,515 | Baker et al. | Oct. 23, 1928 |